June 7, 1932.  I. ORNBERG  1,862,388

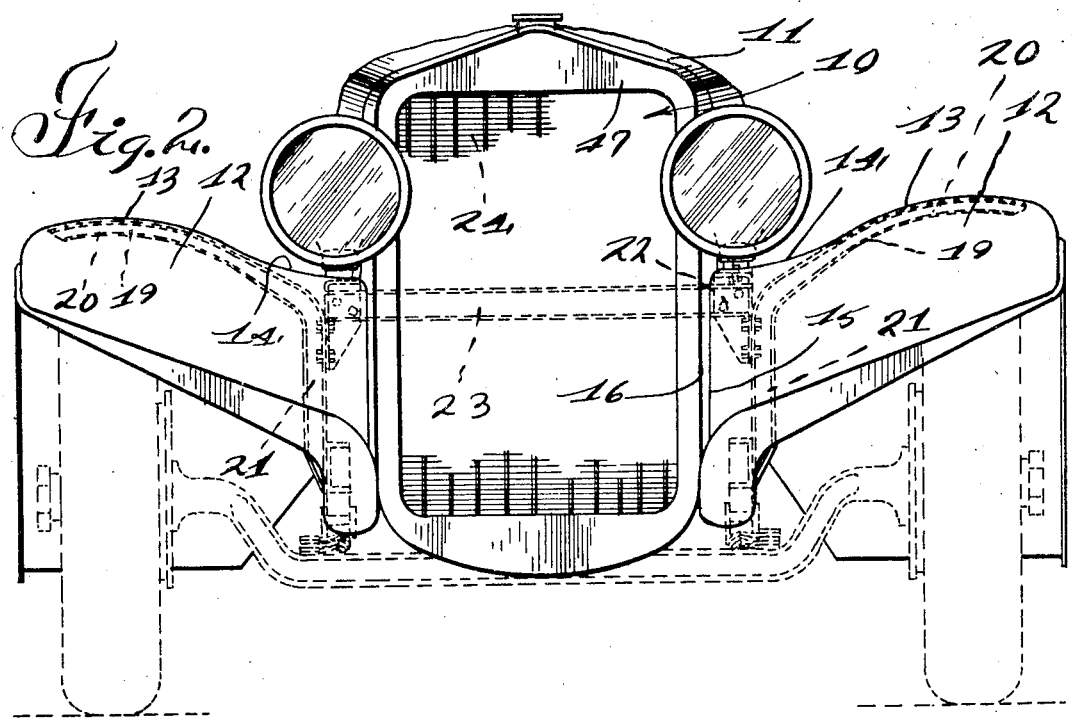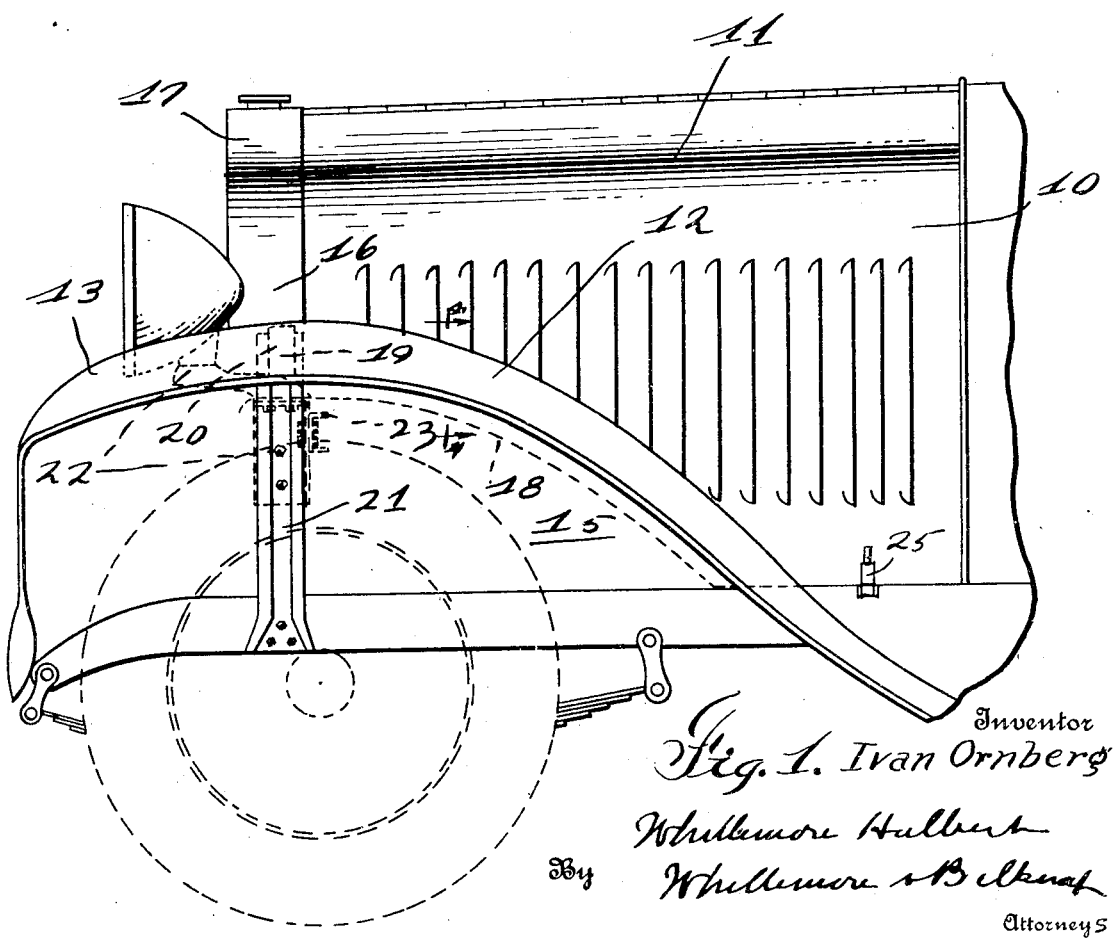

FENDER AND HOOD CONSTRUCTION FOR MOTOR VEHICLES

Filed Aug. 20, 1928   2 Sheets-Sheet 2

Inventor
Ivan Ornberg
By Whittemore Hulbert
Whittemore & Belknap
Attorneys

Patented June 7, 1932

1,862,388

UNITED STATES PATENT OFFICE

IVAN ORNBERG, OF DETROIT, MICHIGAN, ASSIGNOR TO HUPP MOTOR CAR CORPORATION, OF DETROIT, MICHIGAN, A CORPORATION OF VIRGINIA

FENDER AND HOOD CONSTRUCTION FOR MOTOR VEHICLES

Application filed August 20, 1928. Serial No. 300,925.

This invention relates generally to vehicles and more particularly to the fender and hood constructions therefor.

It is one of the primary objects of this invention to cheapen the cost of manufacture and facilitate assembly by simplifying the construction of the several parts involved and by reducing the number of such parts to a minimum.

The invention provides for simplifying the method of manufacture and cheapening the cost of production by introducing a front end construction for vehicles wherein the front fender aprons cooperate with the hood to form a closure for the motor compartment.

An arrangement of the above character offers the possibility of eliminating the usual space between the front fender aprons and hood common in motor vehicles as now commercially produced, and renders possible reducing the wind resistance to a minimum.

Other objects and novel features of this invention reside in the peculiar construction of the several parts involved as will be made more apparent as this description proceeds, especially when considered in connection with the accompanying drawings wherein:

Figure 1 is a side elevational view of a portion of the vehicle constructed in accordance with this invention;

Figure 2 is a front elevation of the construction shown in Figure 1;

Figure 3:
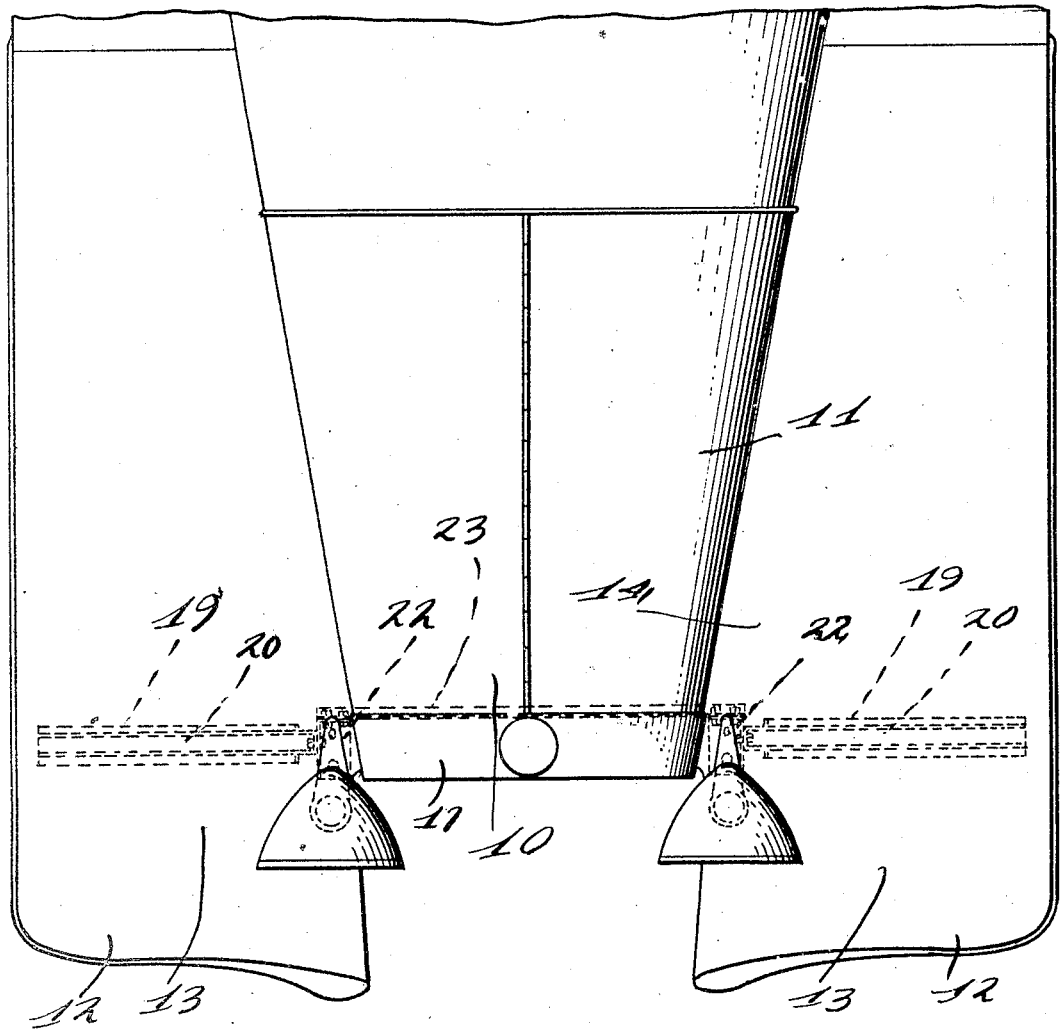
Figure 3 is a plan view thereof.
Figure 4:
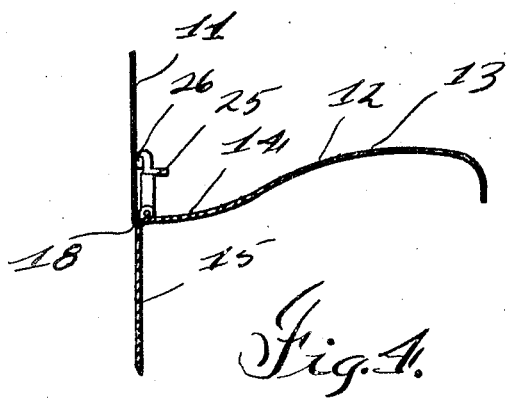
Figure 4 is a sectional view taken on the line 4—4 of Figure 1.

In motor vehicles as now commercially produced, the front fenders are usually provided with aprons inclined from the crown of the fender to the sill members of the frame and are secured to the latter. In other words in the present type of vehicle there is considerable space left between the sides of the hood and the front fender aprons. This construction is objectionable not only due to the fact that the aprons perform no definite function in the assembly, but also due to the wind resistance offered by the inclined fender aprons.

In accordance with the present invention however, the front fender aprons not only perform a definite function but are so designed as to reduce the wind resistance to a minimum.

Referring now more in detail to the drawings, it will be noted that there is illustrated fragmentarily, a vehicle 10 having a hood 11 forming a cover for the engine compartment, and fenders 12 upon opposite sides of the hood. The fenders are provided with the usual crown portions 13 adapted to extend over the wheels of the vehicle, and are further provided with lateral inwardly extending portions 14 terminating in depending flanges or aprons 15. The latter as will be noted from Figure 2 of the drawings are disposed in a substantially vertical plane and are secured directly to the vertical sides 16 of the radiator shell 17 and extend rearwardly therefrom in close proximity to the hood. The lower edges 18 of the hood follow the particular contour of the fender apron substantially throughout the length thereof so as to cooperate therewith to form a closure for the motor compartment. In other words the arrangement is such that the aprons 15 form a continuation of the side walls of the hood when the latter is in its normal position.

For supporting the fenders I provide brackets 19. As shown these brackets are formed with arcuate portions 20 constituting a seat for the crown 13 of the fenders and are further provided with depending portions 21 secured at the lower ends thereof to the side sills of the frame and at the upper ends to the lamp supporting brackets 22. The latter are in turn rigidly secured to the ends of a suitable tie bar 23 which as shown, extends transversely of the vehicle to the rear of the radiator 24 and beneath the edges 18 of the hood. As shown in Figure 2, the lateral extensions 14 of the fender extend over the projecting ends of the tie bar and the lamp supporting bracket. The arrangement being such that these parts are thoroughly concealed from view.

Any suitable means may be utilized for maintaining the hood in closed position herein shown as comprising the conventional clamps 25 secured as at 26 to the lateral portions 14 of the fenders.

Thus from the foregoing, it will be apparent that I have provided a novel fender and hood construction for vehicles wherein the fender aprons extend into close proximity to the side walls of the hood and cooperate with the latter to form a closure for the motor compartment. It will further be noted that by virtue of the particular construction of the fender, the wind resistance is reduced to a minimum.

While one illustrative embodiment of the invention has been described and illustrated herein somewhat in detail, the invention should not be considered as limited by the specific arrangement shown, reservation being made to make such changes in the essential and all of the non-essential details as may come within the purview of the accompanying claims.

What I claim as my invention is:

1. A vehicle having in combination, a hood, a radiator, and a fender having a lateral portion provided at its inner edge with a downwardly extending vertical flange engaging one side of the radiator, said flange having a portion in advance of radiator forming an apron and having another portion in rear of the radiator forming a continuation of the hood.

2. In a vehicle, the combination with a motor compartment, of a hood for said compartment, and a fender of one piece construction having a lateral portion terminating at the inner edge thereof in a vertical downwardly extending flange having a portion positioned opposite the motor compartment and forming a continuation of the hood.

3. A vehicle having in combination, a motor compartment, a hood for said compartment having a hingedly mounted side wall section, a fender having a lateral portion terminating at the inner edge thereof in a substantially vertical downwardly extending flange positioned to one side of the motor compartment and having a portion forming a continuation of the side wall section of the hood and another portion in advance of the lateral portion forming an apron.

4. A vehicle having in combination, a hood having a hingedly mounted side wall section, a fender having a lateral portion terminating at its inner edge in a downwardly extending flange forming a continuation of the side wall section for said hood and serving as an abutment for the lower edge of said side wall section, and means carried by said fender for detachably maintaining the side wall section of said hood in abutting engagement with said flange.

In testimony whereof I affix my signature.

IVAN ORNBERG.